United States Patent
Schuler

(10) Patent No.: US 6,581,484 B1
(45) Date of Patent: Jun. 24, 2003

(54) SENSOR JOINED TO A GLASS PANE WITH A SILICON GEL

(75) Inventor: Thomas Schuler, Wiernsheim (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 0 days.

(21) Appl. No.: 09/485,790
(22) PCT Filed: Aug. 17, 1998
(86) PCT No.: PCT/EP98/05216
§ 371 (c)(1), (2), (4) Date: May 16, 2000
(87) PCT Pub. No.: WO99/09681
PCT Pub. Date: Feb. 25, 1999

(30) Foreign Application Priority Data

Aug. 19, 1997 (DE) .......................... 197 35 876
Feb. 3, 1998 (DE) .......................... 198 04 165

(51) Int. Cl.⁷ ............................................. G12B 9/04
(52) U.S. Cl. ................................................. 73/866.5
(58) Field of Search ........................... 73/866.5, 855; 340/577, 602; 250/227.24, 341.8, 571

(56) References Cited

U.S. PATENT DOCUMENTS

| 3,562,731 | A | * | 2/1971 | Hsu ........................ 200/61.04 |
| 4,701,613 | A | * | 10/1987 | Watanabe et al. ...... 250/227.24 |
| 4,746,381 | A | * | 5/1988 | Parker et al. ................ 138/109 |
| 5,065,892 | A | * | 11/1991 | Lukez ........................ 220/320 |
| 5,262,640 | A | | 11/1993 | Purvis et al. .......... 250/227.25 |
| 5,323,637 | A | * | 6/1994 | Bendicks et al. ........... 318/119 |
| 5,486,258 | A | | 1/1996 | Onishi ...................... 156/307.5 |
| 5,527,083 | A | * | 6/1996 | Kreye ................... 296/146.15 |
| 5,610,618 | A | * | 3/1997 | Adrian et al. ................ 343/711 |
| 5,639,393 | A | * | 6/1997 | Veltum et al. .............. 219/209 |
| 5,804,817 | A | * | 9/1998 | Seiler et al. ........... 250/227.25 |
| 6,052,196 | A | * | 4/2000 | Pientka et al. ......... 250/227.25 |
| 6,250,148 | B1 | * | 6/2001 | Lynam .................... 73/170.17 |

FOREIGN PATENT DOCUMENTS

| DE | 4104179 A1 | * | 8/1992 | ............ F02P/11/02 |
| EP | 0 540 040 | | 5/1993 | |
| EP | 0 737 847 | | 10/1996 | |
| WO | 96/21568 | | 1/1996 | |

* cited by examiner

Primary Examiner—Helen Kwok
Assistant Examiner—David Rogers
(74) Attorney, Agent, or Firm—J. Gordon Lewis

(57) ABSTRACT

A gel is used as the joining agent to mount a rain sensor to a windscreen of an automobile. The gel used does not harden even in the long term, and air pockets which form inside the gel or on the boundary surfaces with the glass pane or the sensor migrate into the area around the sensor. The rain sensor is attached to a glass pane without special elastic intermediate elements, using the elasticity of the joining agent for tolerance compensation.

20 Claims, 5 Drawing Sheets

SENSOR JOINED TO A GLASS PANE WITH A SILICON GEL

BACKGROUND OF THE INVENTION

WO 96/21568 describes a method for joining a sensor to a glass pane with the aid of a transparent adhesive tape. In this case, a so-called acrylic foam may, for example, be utilized as the join medium. This material rigidly adheres to the glass pane and is very difficult to remove. The mounting of a sensor on a glass pane requires a vacuum and, under certain circumstances, the prior heating of the glass pane in order to obtain a joint without air bubbles. If the sensor emits or receives radiation, it is frequently desired to incorporate an infrared-permeable daylight filter (black appearance). However, a corresponding black coloring of the acrylic foam is not possible. Long-term temperature tests at 100 degrees resulted in yellowing and hardening of the acrylic foam. These aging phenomena have negative effects on the function and the mechanical retention of the sensor. Consequently, the invention is based on a joining medium silicone gel.

The invention aims to disclose a non-hardening, transparent joining medium that can be colored such that it is permeable to infrared radiation and ensures a permanent and superior joining of a sensor to the respective body.

SUMMARY OF THE INVENTION

The invention, in principle, consists of utilizing a gel that remains soft. Such a gel is, for example, available on the market under the designation SilGel 612 from Wacker. One preferably utilizes a colorless silicone gel that has a viscosity of approximately 800–1200 mm2/s at 23 degrees C. and a density of approximately 0.96 g/cm3. The index of reaction n025 may have a value of approximately 1.4026 at 25 degrees C. The aforementioned silicone gel is frequently referred to as RTV-2 caoutchouc silicone and is available on the market under the trade name Semicosil 912 from Wacker Chemie GmbH.

The main advantages of this gel can be seen in the fact that it cannot harden, and that it remains a soft, gelatine-like vulcanized material even after a prolonged period of time and after being subjected to heat and insolation for prolonged periods of time. Another important aspect regarding the gel is that it cannot permanently enclose air particles. These air particles are removed from the gel due to their natural movement after a certain period of time. The gel also prevents stress between the housing of the sensor and the glass pane to which the sensor is joined.

One particular advantage of the gel used can be seen in the fact that it can be colored with a dye that is permeable to infrared measuring radiation, with said dye largely acting as a filter for other (light) radiation such that the measuring accuracy of a measuring device (e.g., a rain sensor) that operates with infrared radiation can be increased.

It appears possible to directly join the transmitter and/or receiver (sensor) to the glass pane by means of admixtures to the silicone gel. The present invention also discloses a new method for mounting the sensor on a body, in particular, a windshield, which utilizes the previously described joining medium. In this case, the objective consists of simply pressing the sensor onto the windshield by means of a prestress by utilizing the joining gel. In this respect, it was proposed to elastically join the sensor to the glass pane by means of the gel with the aid of a spring element that is supported on the glass pane, e.g., a spring element that is arranged in the bracket of a rearview mirror which contacts the glass pane. According to the invention, a sensor is particularly suitable for this mounting method. Consequently, the invention, in principle, consists of utilizing a gel of the previously described type as the joining medium for this mounting method, with the transmitter and/or receiver being combined in the form of a transceiver that operates as a rain sensor. The radiation emitted and received by the rain sensor preferably consists of infrared light, with the joining medium being colored with a dye that is permeable to infrared light, in particular, a black dye. Due to this measure, the rain sensor that is usually provided with a dark housing has an entirely black appearance such that the joining medium which is visible through the glass pane cannot be optically differentiated from the rest of the sensor housing.

In order to ensure that the detectors and radiation elements arranged within the sensor and the receiver have exactly the prescribed distance from the glass plane surface, the invention proposes the additional development defined by the projections maintaining an exact distance between the transmitter and/or receiver and the glass pane. In addition, the resulting channels ensure that excess gel is able to escape. Consequently, the gel situated between the sensor surface and the glass pane not only has a predetermined thickness, but the desired density can also be obtained largely independent of the quantity introduced during the mounting process. In this respect, it is possible to apply a slightly larger quantity of the gel than required onto the surface of the sensor which faces the windshield. When the sensor or the sensor housing is subsequently pressed onto the glass pane with its front circumferential edge, the excess gel is able to laterally escape through projections such that the gel is always arranged between the sensor and the glass pane with the same stress and the same density. In order to preserve the density and the stress in the joining medium (gel), the invention proposes the additional development in which as mentioned previously, it was proposed to generate prestress by means of additional springs that are supported on the glass pane. This particular variation can be simplified by utilizing an additional development of the invention which is defined by the combination of characteristics proposes that a holder which acts upon the sensor in a largely rigid fashion is mounted on the glass pane. In this case, the elastic effect is not achieved by means of an additional spring, but rather by the spring effect of the joining medium (gel). Due to this measure, a largely uncomplicated construction for the holder is achieved. In thus case, the wall of the holder is initially connected to the glass pane during the mounting process, whereafter the sensor with its housing and the applied joining medium is inserted into the wall of the holder. Subsequently, the cover is connected to the wall of the holder by exerting a force in the direction of the glass pane. However, other constructions would also be conceivable. For example, the sensor housing can be directly locked in the wall of the holder, or the holder with the inserted sensor (and joining medium) can be mounted (bonded) to the glass pane by exerting a pressing force.

The shape of the wall of the holder is adapted to the outer contour of the sensor. This wall has a particularly simple design if the sensor has an essentially circular shape, i.e., the wall has an annular appearance.

The function of the holder does not necessarily have to consist of providing a support for the sensor relative to the glass pane. The holder may also accommodate electric connections, e.g., in the form of a multiple plug. These electric connections make it possible to connect the sensor to the corresponding electric units during the mounting process. The power supply may also be realized via the electric connections of the holder.

The holder may, in principle, be simply bonded to the glass pane by means of adhesive agents. However, it would also be conceivable to lock the holder on the glass pane by means of locking elements that are cast into the glass pane. A particularly simple arrangement for the holder is proposed in a combination of characteristics in which the holder is shaped out of the glass pane material or cast into the glass pane. For example, a holder that consists of metal or plastic is cast into the glass pane during its manufacture. However, the glass pane material can also be directly shaped into a holder. Accordingly, connecting lines which lead to the holder are not bonded onto the glass pane in this case, but directly cast into the glass pane.

If the quantity of the joining medium situated between the sensor and the glass pane is precisely metered, the sensor can be arranged at a prescribed distance from the glass pane and the joining medium can be provided with the desired density between the sensor and the glass pane, e.g., if the holder and the sensor are subject to strict tolerances. However, in order to allow an additional tolerance, the invention proposes an additional development in which the projections do not necessarily have to contact the glass pane in order to exactly maintain the corresponding distance. It suffices if the projections form channels, through which the excess joining medium can be laterally pressed out due to a predetermined force, i.e., the gel subsequently has a predetermined thickness. The width of the channels consequently influences the stress to which the gel is subjected in the joined state.

The snap-in connection between the holder and the sensor in accordance with the invention can also be utilized for separating this connection if a permissible lateral force is exceeded. In this case, the sensor is freely movable relative to the glass pane such that the risk of injuries due to a projecting sensor is eliminated during an accident

BRIEF DESCRIPTION OF THE DRAWING

One embodiment of the invention is described below with reference to the figures which show.

DESCRIPTION OF THE PREFERRED EMBODIMENT

Figure 1:
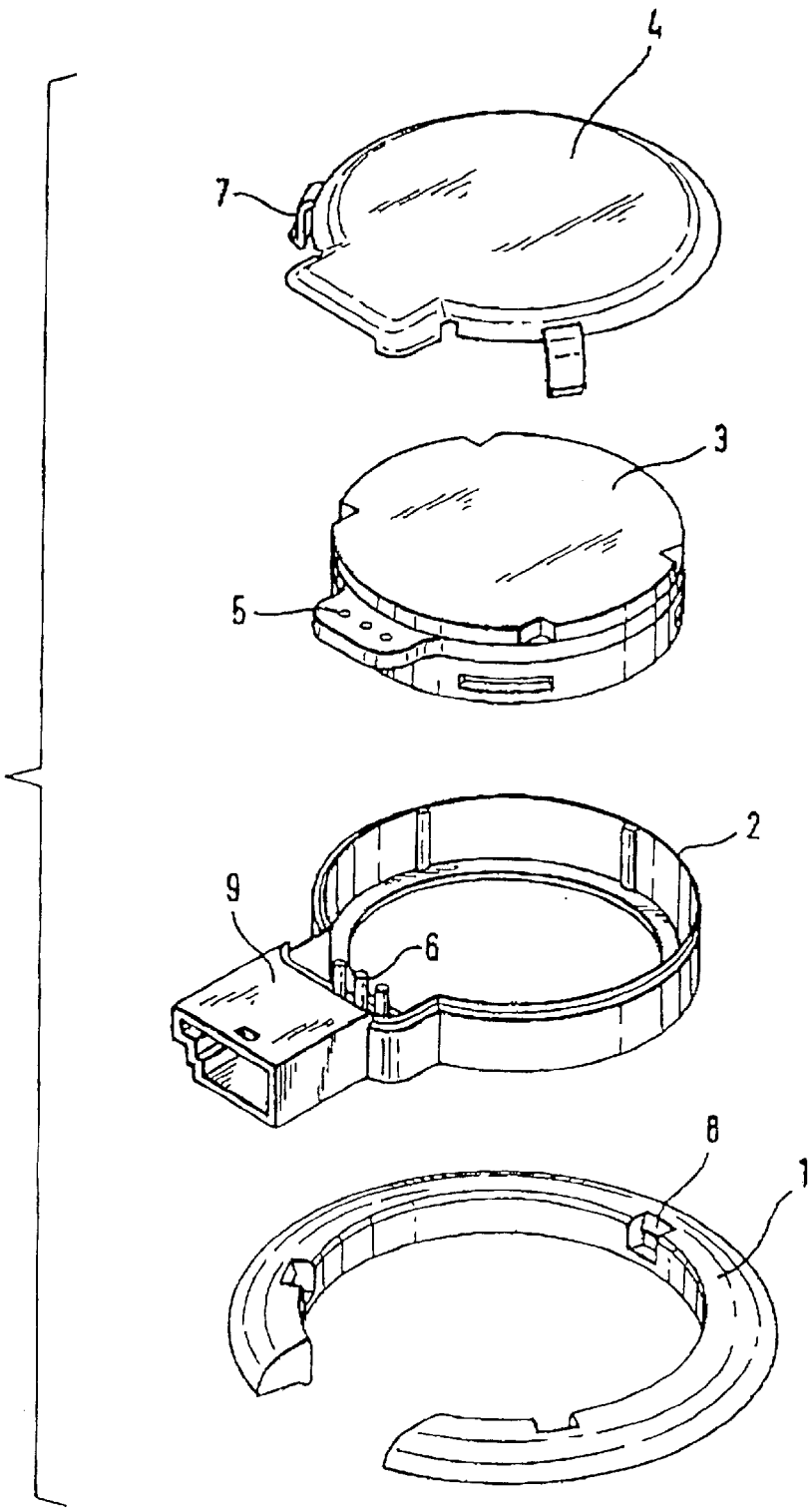
FIG. 1 is an exploded view of the holder with the sensor.

FIG. 1 shows a sensor 3 that can be inserted into a sensor housing 2. The sensor housing 2 contains a plug, with plug sockets 5 being contacted with a series of plugs 6 when inserting the sensor 3 into the housing 2. A holder that consists of a holding ring 1 (frequently referred to as the wall of the holder above) and a cover 4 accommodates the sensor housing 2 with the inserted sensor 3. The cover 4 contains locking tabs 7 that engage into corresponding recesses 8 when mounting the sensor 2, 3 in the holder 1, 4. The holder is connected to a not-shown glass pane by means of an adhesive connection.

Figure 2:
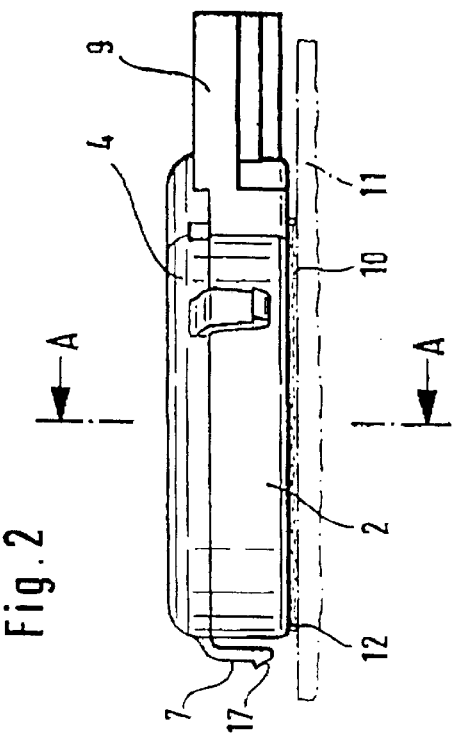
FIG. 2 is a view of the sensor in its mounting position on the glass pane (without a holding ring)

FIG. 2 shows an enlarged representation of the sensor housing 2, onto which the holder cover 4 with its locking tabs 7 is attached. The ring, or wall 1, of the holder was omitted in order to illustrate the layer of the joining medium 10 arranged on the windshield 11 of a motor vehicle.

Figure 3:
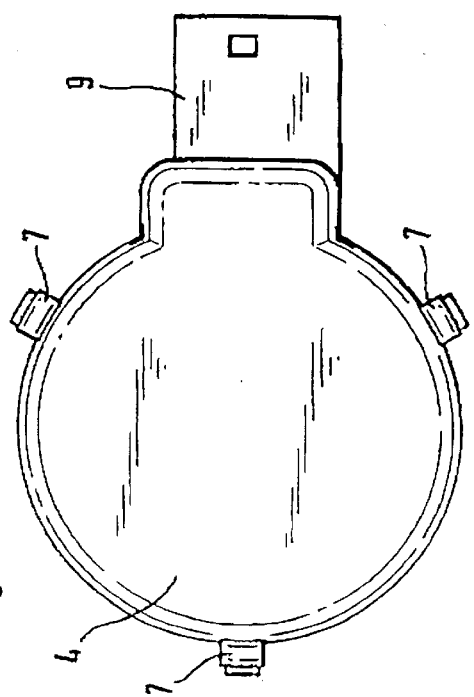
FIG. 3 is a top view of the sensor according to FIG. 2.

FIG. 3 shows the sensor 3 with the holder cover 4 in the form of a top view, with only the plug 9 of the sensor housing 2 being visible in this case.

Figure 4:
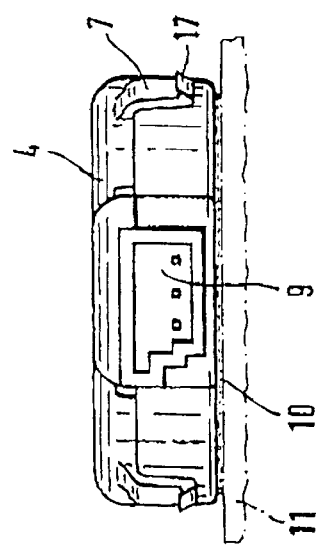
FIG. 4 is a front view of the sensor according to FIG. 2.

FIG. 4 shows the sensor with the cover in the form of a view that is directed onto the plug 9.

Figure 5:
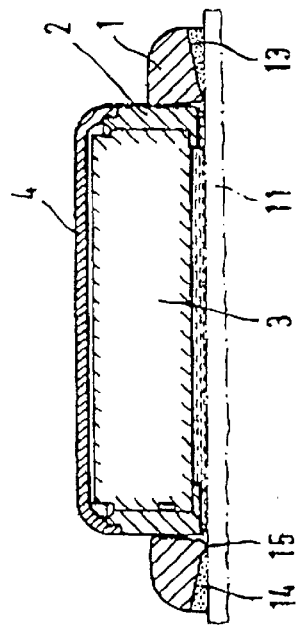
FIG. 5 is a section through the sensor with a holder cover along the line A—A in FIG. 2.
Figure 6:
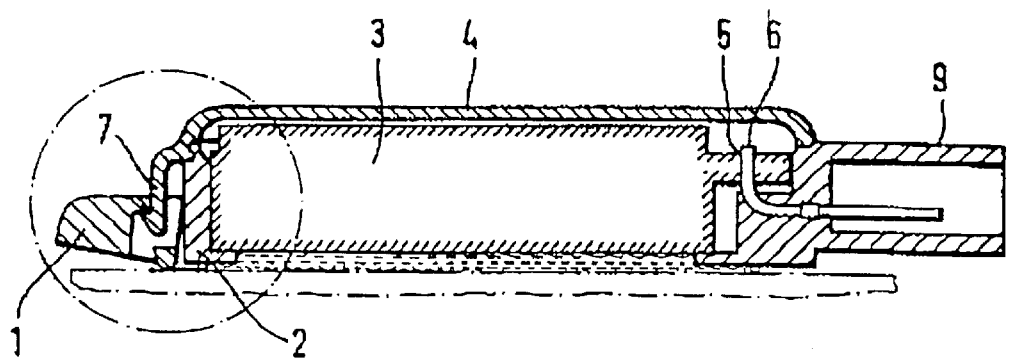
FIG. 6 is a sectioned side view of the sensor according to FIG. 2.
Figure 7:
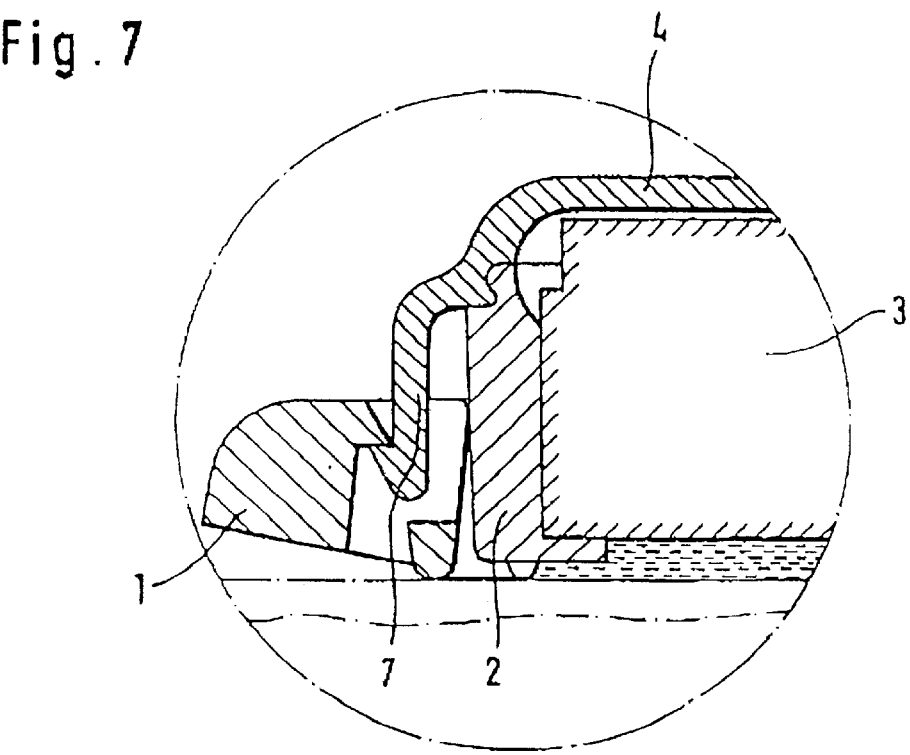
FIG. 7 is an enlarged detail of FIG. 6.

FIG. 5 shows a section along the line A—A in FIG. 2, with the sensor 3 situated within its housing 2 also being recognizable in the form of a section. Outside of the circumference of the housing 2, the holding ring is shown in its not yet installed position. In the installed position, the holding ring is bonded to the glass pane by means of a not-shown adhesive layer. FIG. 2 also shows the projections 12 which ensure a predetermined thickness of the layer of the joining medium 10.

Figure 10:
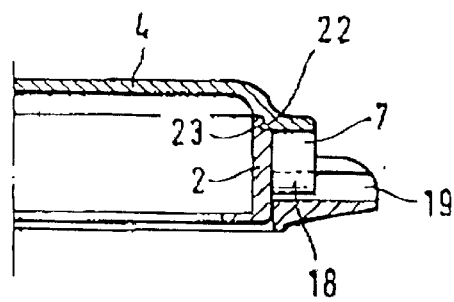
FIG. 10 is a side view of the interlocking according to FIG. 9.

In FIG. 5 and FIG. 10, the holding ring 1 is shown with an inclined adhesive surface 13 relative to the glass pane surface. An essentially annular adhesive layer 14, the thickness of which decreases radially inward in the form of a wedge, is situated between the adhesive surface 13 and the glass pane 11. The holding ring 1 contains a sealing strip 15 on its radially inner side which is intended to prevent the adhesive 14 from flowing toward the sensor housing 2 such that the housing can be easily removed from the holding ring 1. The adhesive surface 13 does not necessarily have to be inclined relative to the glass pane. In numerous instances, it is advantageous to maintain this adhesive surface essentially parallel to the glass pane 11 such that the adhesive layer 14 has the shape of an annular disk. This reduces the quantity of adhesive mass used and, if so required, increases the adhesive force.

FIGS. 1–7 show a first method for mounting the sensor 3 in the holder 1, 4. In this case, projections 17 which protrude radially outward on the locking tabs 7 engage into corresponding recesses 8 (see FIG. 1) in the holding ring 1 of the holder.

Figure 8:
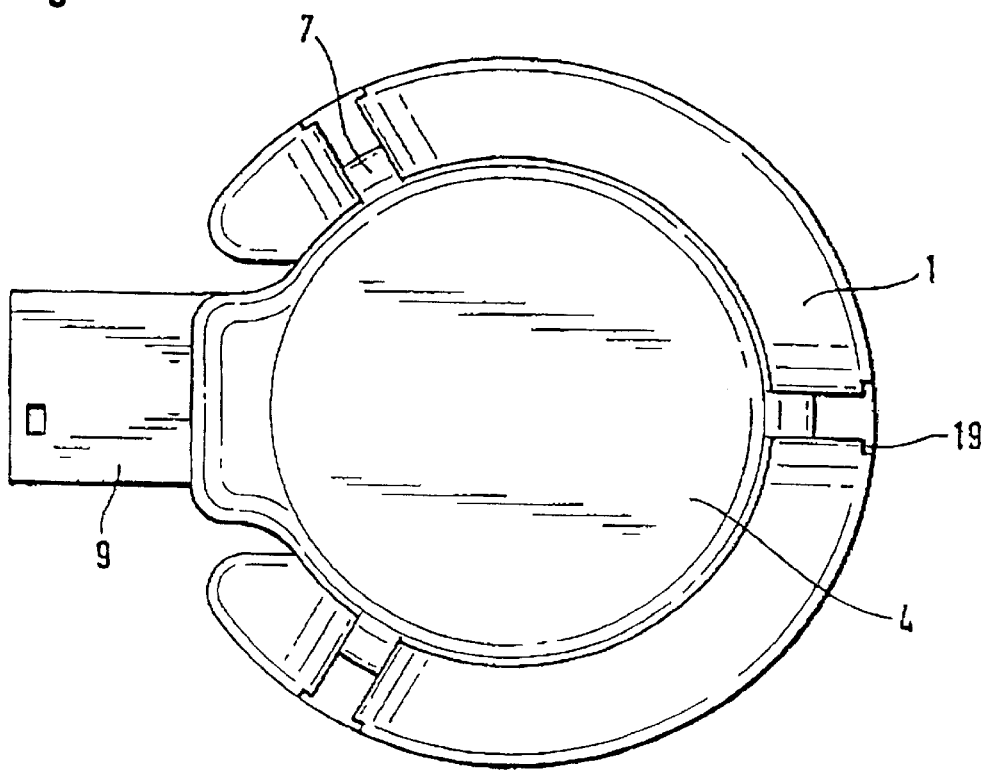
FIG. 8 is a top view of the sensor with a holder cover and a holding ring which corresponds to the top view according to FIG. 3, however, with a modified cover mounting.
Figure 9:
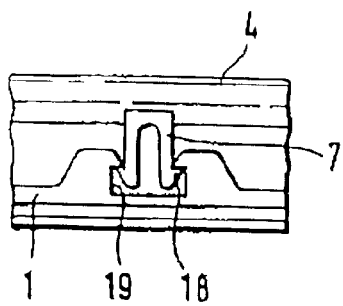
FIG. 9 is a schematic representation of the interlocking between the holder cover and the holding ring according to FIG. 8.
Figure 11:
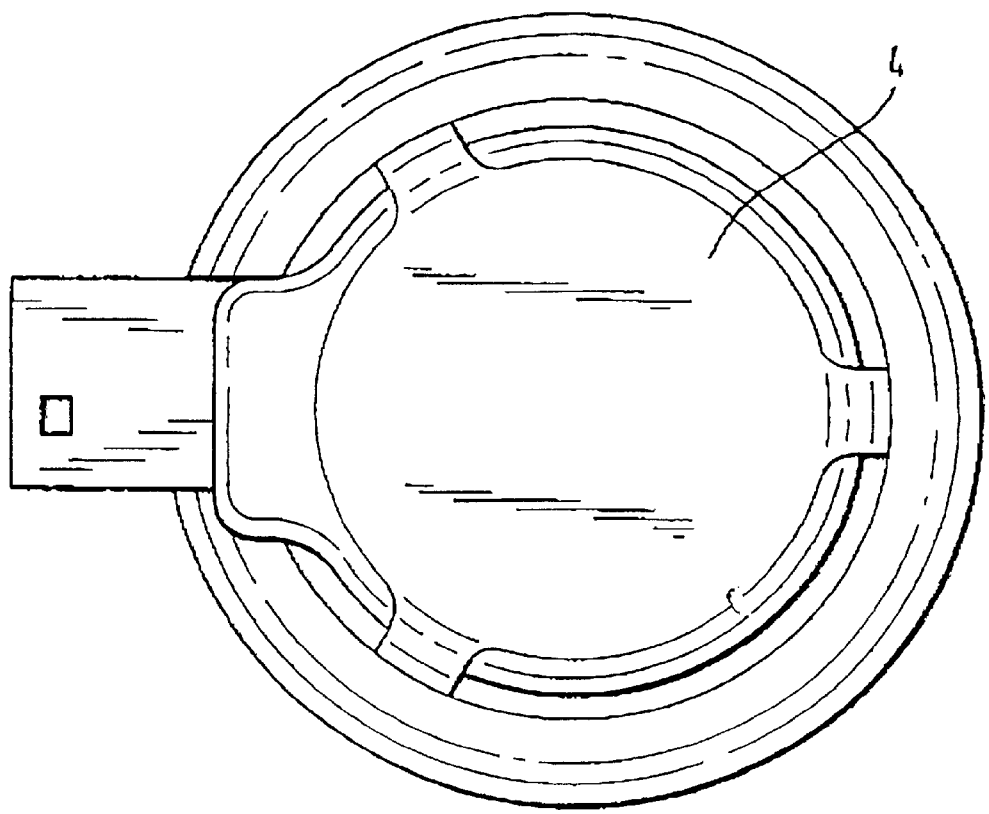
FIGS. 11 and 12 are views of a sensor with a modified cover which correspond to the view shown in FIG. 3.
Figure 12:
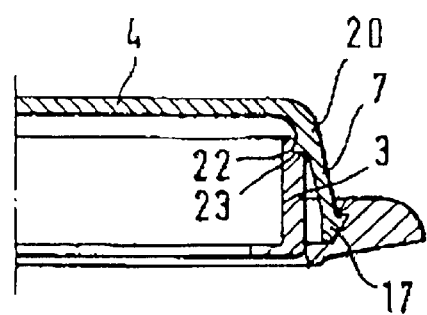

FIGS. 8–10 show a second mounting method, in which tangentially extending projections 18 engage into corresponding recesses 19 in the holding ring 1 of the holder. In this case, two projections 18 that can be subjected to excursions in opposite directions are respectively provided on the tabs 7. Another option which is realized similar to that shown in FIGS. 1–7 is illustrated in FIGS. 11 and 12. In this case, projections 17 that point radially outward are provided. The novelty of this option can be seen in the fact that the ends 20 of the locking tabs 7 on the side of the cover positively engage on the outer edge of the sensor 3. In this case, a circumferential projection 22 may, for example, engage into a circumferential recess 23 in the housing 2 so as to center the cover 4 and fix said cover 4 in the direction that extends perpendicular to the glass pane 11 such that the locking force of the projections 17 can be defined more precisely.

FIGS. 3 and 8 indicate that the circumferential recess 23 and the circumferential projection 22 may essentially extend circularly, with the cover only being supported on the housing at three points in the variation according to FIG. 12.

What is claimed is:

1. A device for mounting a rain sensor on a body comprising:
    a silicone gel permeable to infrared light joining the rain sensor to the body;
    the rain sensor rigidly embedded in a sensor housing;
    an edge of the sensor housing resting on the body having local projections; and
    a holder supporting the sensor housing on the body, the holder including:
        a wall protruding from the body, the wall accommodating a portion of the sensor housing; and
        a cover enclosing the sensor within the sensor housing, the cover having locking tabs connectable to respective recesses in the wall and having at least one of a radially-extending projection and a radially-extending recess such that, in a closed position, the at least one of the radially-extending projection and the radially-extending recess of the cover respectively engages one of a radially-extending recess and a radially-extending projection of the housing.

2. The device according to claim 1, wherein the projections form intermediate spaces through which excess silicone gel can escape.

3. The device according to claim 1 wherein:
    dimensions of the holder, the sensor and the silicone gel are chosen such that the sensor is pressed against the elastically acting silicone gel in its mounted condition.

4. The device according to claim 3, wherein the interlocked connection is provided with at least one predetermined breaking point that separates the connection under a defined opening force.

5. The device according to claim 1 wherein the housing contains electric connections that serve for one of receiving signals from the sensor and for supplying the sensor with power.

6. The device according to claim 1 further comprising:
    one of the holder and the sensor housing containing lateral openings within the region of the silicone gel, with the lateral openings allowing excess silicone gel to escape through the openings.

7. The device according to claim 6, wherein the openings are formed by projections that extend essentially perpendicular to the surface of the body and are supported on the surface.

8. The device according to claim 1 wherein a portion of the wall is integrally molded with the body.

9. The device according to claim 1 wherein the at least one of the radially-extending projection and the radially-extending recess of the cover is one element extending about the outer peripheral edge of the cover.

10. A device for mounting a rain sensor to a windshield of a vehicle, comprising:
    a silicone gel joining a portion of a facing surface of the rain sensor to the windshield;
    a sensor housing surrounding at least an outer peripheral edge of the rain sensor;
    projections extending from a surface of the sensor housing facing the windshield, the projections in contact with the windshield; and
    a holder engaged about an outer peripheral edge of the sensor housing, the holder including:
        a sealing strip extending along an inside edge of the holder, the sealing strip in contact with the windshield and spaced from the outer peripheral edge of the sensor housing;
        an adhesive surface extending away from the sealing strip, the adhesive surface opposed to and spaced from the windshield; and
        an inner surface extending from the sealing strip and away from the windshield to contact the sensor housing.

11. The device according to claim 10 wherein the adhesive surface is inclined in a direction away from the sensor housing.

12. The device according to claim 10 wherein the holder further comprises a cover with locking tabs engageable with at least one recess spaced about a surface of the holder opposite the adhesive surface.

13. The device according to claim 10, further comprising:
    an electrical connector extending from the outer peripheral edge of the sensor housing.

14. The device according to claim 10 wherein the silicone gel is dyed to a color permeable to infrared light.

15. The device according to claim 14 wherein the silicone gel is dyed black.

16. A device for mounting a rain sensor to a windshield of a vehicle, comprising:
    a silicone gel joining a portion of a facing surface of the rain sensor to the windshield;
    a housing extending between the windshield and the rain sensor for a remainder of the facing surface of the rain sensor and extending from a surface of the windshield to enclose an outside peripheral edge of the sensor; and
    projections extending from a surface of the housing facing the windshield, the projections in contact with the windshield.

17. The device according to claim 16 wherein the projections are spaced to allow excess silicone gel to escape.

18. The device according to claim 16, further comprising:
    a holder supporting the housing on the windshield, the holder including a wall protruding from the windshield and accommodating a portion of the housing, wherein at least a portion of the holder is integrally molded with the windshield.

19. A device for mounting a rain sensor that operates with radiation on a body with the rain sensor being joined to the body with silicone gel comprising:
    silicone gel being colored with a dye that is permeable to infrared light;
    the rain sensor being rigidly embedded in a sensor housing;
    an edge of the sensor housing which rests on the body being provided with local projections; and
    a holder mounted on the body, with the holder engaging on the sensor by one of directly and by an essentially rigid intermediate element and the holder indirectly pressing the sensor against the body via the silicone gel, wherein the holder is realized integrally with the body.

20. A device for mounting a rain sensor that operates with radiation on a body with the rain sensor being joined to the body with silicone gel comprising:
    silicone gel being colored with a dye that is permeable to infrared light;
    the rain sensor being rigidly embedded in a sensor housing;
    an edge of the sensor housing which rests on the body being provided with local projections; and a holder mounted on the body, with the holder engaging on the sensor by one of directly and by an essentially rigid intermediate element and the holder indirectly pressing the sensor against the body via the silicone gel, wherein electric supply lines leading to the holder extend within the body.

* * * * *